US010647842B2

(12) United States Patent
Thompson et al.

(10) Patent No.: US 10,647,842 B2
(45) Date of Patent: May 12, 2020

(54) ANTI-AGGLOMERANTS FOR ELASTOMERIC ETHYLENE/A-OLEFIN COPOLYMERS

(71) Applicant: ARLANXEO SINGAPORE PTE. LTD., Singapore (SG)

(72) Inventors: David Thompson, London (CA); Clinton Lund, London (CA)

(*) Notice: Subject to any disclaimer, the term of this patent is extended or adjusted under 35 U.S.C. 154(b) by 303 days.

(21) Appl. No.: 15/107,529

(22) PCT Filed: Dec. 22, 2014

(86) PCT No.: PCT/CA2014/051251
§ 371 (c)(1),
(2) Date: Jun. 23, 2016

(87) PCT Pub. No.: WO2015/095962
PCT Pub. Date: Jul. 2, 2015

(65) Prior Publication Data
US 2016/0312021 A1 Oct. 27, 2016

(30) Foreign Application Priority Data

Dec. 23, 2013 (EP) .................................... 13199466
Mar. 19, 2014 (EP) .................................... 14160718

(51) Int. Cl.
*C08L 23/16* (2006.01)
*C08K 5/098* (2006.01)
*C08K 5/103* (2006.01)
*C08L 71/02* (2006.01)
*C09D 133/26* (2006.01)
*C08J 3/07* (2006.01)
*C08J 3/03* (2006.01)
*C08L 1/28* (2006.01)

(52) U.S. Cl.
CPC ............ *C08L 23/16* (2013.01); *C08J 3/03* (2013.01); *C08J 3/07* (2013.01); *C08K 5/098* (2013.01); *C08K 5/103* (2013.01); *C08L 71/02* (2013.01); *C09D 133/26* (2013.01); *C08J 2323/16* (2013.01); *C08L 1/28* (2013.01)

(58) Field of Classification Search
CPC . C08L 71/02; C08L 23/16; C08L 1/28; C08K 5/098; C08K 5/103; C08J 3/03; C08J 3/07; C08J 2323/16; C09D 133/26
USPC .......................................................... 524/46
See application file for complete search history.

(56) References Cited

U.S. PATENT DOCUMENTS

| 2,880,184 A | 3/1959 | Groves et al. |
| 3,085,074 A | 4/1963 | Burke, Jr. et al. |
| 3,144,426 A | 8/1964 | Burke |
| 3,250,737 A | 5/1966 | Halper et al. |
| 3,287,440 A | 11/1966 | Giller |
| 3,298,986 A | 1/1967 | Ray |
| 3,301,810 A | 1/1967 | Hunter et al. |
| 3,770,682 A | 11/1973 | Hubbard et al. |
| 3,886,109 A | 5/1975 | van Hardeveld et al. |
| 3,922,240 A | 11/1975 | Berg et al. |
| 3,923,707 A | 12/1975 | Gerhard et al. |
| 3,976,609 A | 8/1976 | Schnoring et al. |
| 4,059,651 A | 11/1977 | Smith, Jr. |
| 4,130,519 A | 12/1978 | Roper et al. |
| 4,474,924 A | 10/1984 | Powers et al. |
| 4,946,899 A | 8/1990 | Kennedy et al. |
| 5,539,065 A | 7/1996 | Baade et al. |
| 5,804,614 A | 9/1998 | Tanaglia |
| 5,886,106 A | 3/1999 | Sumner et al. |
| 5,889,123 A | 3/1999 | Schubart et al. |
| 7,485,680 B2 | 2/2009 | Furukawa et al. |
| 7,491,773 B2 | 2/2009 | Shaffer et al. |
| 7,723,447 B2 | 5/2010 | Milner et al. |
| 8,329,108 B2 | 12/2012 | Lovegrove et al. |
| 8,415,432 B1 | 4/2013 | Ralf et al. |
| 8,580,876 B2 | 11/2013 | Pirrung et al. |
| 8,623,462 B2 | 1/2014 | Zapf et al. |
| 8,747,756 B2 | 6/2014 | Feller et al. |
| 9,068,031 B2 | 6/2015 | Hanns-Ingolf et al. |
| 9,156,932 B2 | 10/2015 | Mruk et al. |
| 9,657,158 B2 | 5/2017 | Leiberich et al. |
| 9,993,793 B2 | 6/2018 | Dihora et al. |
| 10,000,632 B2 | 6/2018 | Thompson et al. |
| 10,081,711 B2* | 9/2018 | Thompson ................ C08J 3/07 |
| 10,106,656 B2 | 10/2018 | Thompson et al. |
| 2001/0049402 A1 | 12/2001 | Foster |
| 2002/0111414 A1 | 8/2002 | Langstein et al. |
| 2002/0132904 A1 | 9/2002 | Langstein et al. |
| 2003/0012954 A1 | 1/2003 | Schauer et al. |

(Continued)

FOREIGN PATENT DOCUMENTS

| CA | 2 198 473 A | 9/1996 |
| CN | 1845949 A | 10/2006 |

(Continued)

OTHER PUBLICATIONS

Kirk-Othmer Encyclopedia of Chemical Technology, Bearing Materials to Carbon, 4th Edition, 1992, John Wiley & Sons, Abstract.
Morton, M., Introduction to Polymer Science, Rubber Technology, 1987, Springer, Boston, MA, Abstract.
Encyclopedia of Polymer Science and Engineering, vol. 4, Composites,Fabrication to Die Design, Compounding, 1986, John Wiley & Sons, Inc., pp. 67-79.
Intellectual Property Office of Singapore, Search Report for Singapore Application No. 112016051145, dated Oct. 10, 2016, four pages.
International Search Report for International Application No. PCT/CA2014/051251, dated Apr. 20, 2015, two pages.

(Continued)

*Primary Examiner* — Angela C Scott
(74) *Attorney, Agent, or Firm* — The Dobrusin Law Firm, P.C.

(57) ABSTRACT

The invention relates to a method to reduce or prevent agglomeration of elastomeric ethylene/α-olefin copolymer particles in aqueous media by LCST compounds.

15 Claims, No Drawings

(56) References Cited

U.S. PATENT DOCUMENTS

| | | |
|---|---|---|
| 2004/0244978 A1 | 12/2004 | Shaarpour |
| 2006/0141254 A1 | 6/2006 | Kramer et al. |
| 2007/0015853 A1 | 1/2007 | Weng |
| 2007/0203306 A1 | 8/2007 | Resendes et al. |
| 2007/0213444 A1 | 9/2007 | Weng |
| 2007/0225405 A1 | 9/2007 | Cegelski et al. |
| 2007/0299161 A1 | 12/2007 | McDonald et al. |
| 2008/0255310 A1 | 10/2008 | Tsou et al. |
| 2008/0319119 A1 | 12/2008 | Waddell |
| 2009/0118466 A1 | 5/2009 | Jiang |
| 2011/0060086 A1 | 3/2011 | Rodgers et al. |
| 2012/0022195 A1 | 1/2012 | Miyauchi et al. |
| 2012/0264872 A1 | 10/2012 | Weiss et al. |
| 2013/0072605 A1 | 3/2013 | Wong |
| 2013/0157071 A1 | 6/2013 | Fujii |
| 2016/0333148 A1 | 11/2016 | Arsenault et al. |
| 2016/0347913 A1 | 12/2016 | Thompson et al. |
| 2017/0002121 A1 | 1/2017 | Thompson |
| 2019/0002645 A1 | 1/2019 | Thompson et al. |

FOREIGN PATENT DOCUMENTS

| | | |
|---|---|---|
| CN | 102115506 A | 7/2011 |
| CN | 102344637 B | 7/2013 |
| CN | 102952303 B | 6/2014 |
| EP | 0363208 A3 | 9/1991 |
| EP | 0629649 A1 | 12/1994 |
| EP | 1215242 A | 6/2002 |
| EP | 2607102 A | 6/2013 |
| JP | S30-005642 | 10/1957 |
| JP | S50-90693 A2 | 7/1975 |
| JP | S51-49242 A | 4/1976 |
| JP | 51069551 A2 | 6/1976 |
| JP | S51-069551 A2 | 6/1976 |
| JP | S54-1741 A2 | 1/1979 |
| JP | S57-25309 A | 2/1982 |
| JP | S5891702 A | 5/1983 |
| JP | S6151004 A | 3/1986 |
| JP | S63-010636 B2 | 1/1988 |
| JP | H04161441 A | 6/1992 |
| JP | H06322004 A | 11/1994 |
| JP | S5274683 A | 6/1997 |
| JP | H115846 A | 1/1999 |
| JP | 2003191375 A | 7/2003 |
| JP | 2004155880 A | 6/2004 |
| JP | 2006219609 A2 | 8/2006 |
| JP | 2008013608 A2 | 1/2008 |
| JP | 2009073931 A2 | 4/2009 |
| JP | 2009095691 A | 5/2009 |
| JP | 2012087239 S | 5/2012 |
| JP | 2012229335 A | 11/2012 |
| JP | 2013032422 A2 | 2/2013 |
| WO | 2004014997 A3 | 8/2004 |
| WO | 2006118674 A1 | 11/2006 |

OTHER PUBLICATIONS

Supplementary European Search Report for European Application No. EP14873807, dated Jul. 31, 2017, three pages.
Technical Information Sheet, Oppanol, Mar. 2013, BASF The Chemical Company, pp. 1-28.
Din En 1890, German Standard Specification, Sep. 2006, Standards Committee Materials Testing, Abstract, available at https://www.din/de/en/getting-involved/standards-committees/nmp/standards, two pages.
Vold, Marjorie J., et al., "Crystal forms of anhydrous calcium stearate derivable from calcium stearate monohydrate", Journal of Colloid Science, vol. 4, Issue 2, Apr. 1949, pp. 93-101. (Abstract only).
Mildenberg, R., et al., Chapter 5, Applications, Hydrocarbon Resins, VCH Verlag, 1997, pp. 75-154.
International Search Report from International Application No. PCT/CA2014/051248, dated Apr. 17, 2015, two pages.
International Search Report from International Application No. PCT/CA2014/051250, dated Apr. 21, 2015, two pages.
Kirk-Othmer Encyclopedia of Chemical Technology, Bearing Materials to Carbon, vol. 4, 1992, John Wiley & Sons, Bibliographic Information. (Abstract only).
Supplementary European Search Report from European Application No. 14875732, dated Jul. 26, 2017, two pages.
Maurice Morton, Rubber Technology, $3^{rd}$ Edition; Van Nostrand Reinhold Company, (1987) pp. 297-300.
Related U.S. Appl. No. 15/107,324, filed Jun. 22, 2016, published as US2016-0347913.
Related U.S. Appl. No. 16/122,310, filed Sep. 5, 2018, published as US 2019-0002645.
Related U.S. Appl. No. 15/107,511, filed Jun. 23, 2016, published as US2016-0333148.

* cited by examiner

ANTI-AGGLOMERANTS FOR ELASTOMERIC ETHYLENE/A-OLEFIN COPOLYMERS

FIELD OF THE INVENTION

The invention relates to a method to reduce or prevent agglomeration of elastomeric ethylene/α-olefin copolymer particles in aqueous media by LCST compounds.

BACKGROUND

Elastomeric ethylene/α-olefin copolymer, inter alia includes both the copolymer EPM (ethylene-propylene monomers) as well as the interpolymer EPDM (ethylene-propylene diene M-rubber).

Elastomeric ethylene/α-olefin copolymer is produced commercially mainly in a solution polymerization process and slurry polymerization process. In the solution process, the reaction is carried out in an inert solvent, typical solid content 5-14 wt %. In the slurry process, the reaction is carried out in a diluent, the polymer is insoluble in the reaction medium. Typical solid content varies between 20 and 40%.

In an elastomeric ethylene/α-olefin copolymer polymerization, the reaction mixture typically comprises the elastomeric ethylene/α-olefin copolymer, diluent, whereby the term organic diluent generally encompasses diluting or dissolving organic chemicals which are liquid under reaction conditions, residual monomers and catalyst residues.

Downstream the reactor system, the reaction is "killed", unreacted monomers, preferably volatile monomers are removed typically at reduced pressure via flashing and then the rubber needs to be separated from it's diluent/heavies. In the so-called "wet finishing" process, the viscous cement (solution process) or organic "slurry" (slurry process) is pumped into a agitated vessel partly full of boiling water: the diluent/heavies flash off and together with water vapor, pass overhead to a condenser and to a decanter for recovery and re-use.

The water is containing typically at least one anti-agglomerant: typical applied anti-agglomerants: carboxylic acid salts of multivalent metal ions, nonionic surfactants and layered silicate, in particular talcum, preferable in the form of $3MgO.4SiO_2.H_2O$.

As a result of this operation a slurry of elastomeric ethylene/α-olefin copolymer particles in hot water is obtained, that needs to be dewatered and dried.

The isolated rubber particles may then be treated with additional auxiliary agents like anti-agglomerant, in particular with fatty acid salt of a multivalent metal ion, in particular with calcium stearate or zinc stearate, are then dried, baled and packed for delivery.

The anti-agglomerant ensures that in the process steps described above the elastomeric ethylene/α-olefin copolymer particles stay suspended and show a reduced tendency to agglomerate.

In the absence of an anti-agglomerant the naturally high adhesion of elastomeric ethylene/α-olefin copolymer would lead to rapid formation of a non-dispersed mass of rubber in the process water, plugging the process and leading to fouling.

The fundamental disadvantage of fatty acid salts of a multivalent metal ion, in particular calcium stearate and zinc stearate which are normally added later on before the dryer for friability properties, is their chemical interaction with elastomeric ethylene/α-olefin copolymer cure systems, for example causing slower cure times in resin cured compounds in particular those containing isoprene-iosolefin-elastomers. In addition, for EPM or its functionized derivatives as petroleum additives in particular haziness is caused by such auxiliary agents, like talcum.

Therefore, there is still a need for providing a process for the preparation of elastomeric ethylene/α-olefin copolymer particles in aqueous media having reduced or low tendency of agglomeration and in particular avoiding the problems described above.

SUMMARY OF THE INVENTION

According to one aspect of the invention, there is provided a process for the preparation of an aqueous slurry comprising a plurality of elastomer particles suspended therein, the process comprising at least the step of:
 A) contacting an organic medium comprising
    i) at least one elastomeric ethylene/α-olefin copolymer and
    ii) an organic diluent
    with an aqueous medium comprising at least one LCST compound having a cloud point of 0 to 100° C., preferably 5 to 100° C., more preferably 15 to 80° C. and even more preferably 20 to 70° C. and
 B) removing at least partially the organic diluent to obtain the aqueous slurry comprising the elastomeric ethylene/α-olefin copolymer particles.

As used herein a LCST compound is a compound which is soluble in a liquid medium at a lower temperature but precipitates from the liquid medium above a certain temperature, the so called lower critical solution temperature or LCST temperature. This process is reversible, so the system becomes homogeneous again on cooling down. The temperature at which the solution clarifies on cooling down is known as the cloud point (see German standard specification DIN EN 1890 of September 2006). This temperature is characteristic for a particular substance.

Depending on the nature of the LCST compound which typically comprises hydrophilic and hydrophobic groups the determination of the cloud point may require different conditions as set forth in DIN EN 1890 of September 2006. Since this DIN was developed for non-ionic surface active agents obtained by condensation of ethylene oxide another method was established to ensure determination of cloud points for a broad variety of LCST compounds as well.

Therefore the term LCST compound as used herein covers all compounds where a cloud point of 0 to 100° C., preferably 5 to 100° C., more preferably 15 to 80° C. and even more preferably 20 to 80° C. can be determined by at least one of the following methods:
 1) DIN EN 1890 of September 2006, method A
 2) DIN EN 1890 of September 2006, method C
 3) DIN EN 1890 of September 2006, method E
 4) DIN EN 1890 of September 2006, method A wherein the amount of compound tested is reduced from 1 g per 100 ml of distilled water to 0.05 g per 100 ml of distilled water.
 5) DIN EN 1890 of September 2006, method A wherein the amount of compound tested is reduced from 1 g per 100 ml of distilled water to 0.2 g per 100 ml of distilled water.

In another embodiment the cloud points indicated above can be determined by at least one of the methods 1), 2) or 4).

In a preferred embodiment the LCST compounds are those which cloud points can be determined by at least one of the methods 1), 3) or 4).

As a consequence, non-LCST compounds are those compounds having either no cloud point or a cloud point outside the scope as defined hereinabove. It is apparent to those skilled in the art and known from various commercially available products, that the different methods described above may lead to slightly different cloud points. However, the measurements for each method are consistent and reproducible within their inherent limits of error and the general principle of the invention is not affected by different LCST temperatures determined for the same compound as long as with at least one of the above methods the cloud point is found to be within the ranges set forth above.

It is apparent to those skilled in the art and known from various commercially available products, that the different methods described above may lead to slightly different cloud points. However, the measurements for each method are consistent and reproducible within their inherent limits of error and the general principle of the invention is not affected by different LCST temperatures determined for the same compound as long as with at least one of the above methods the cloud point is found to be within the ranges set forth above.

DETAILED DESCRIPTION OF THE INVENTION

The invention also encompasses all combinations of preferred embodiments, ranges parameters as disclosed hereinafter with either each other or the broadest disclosed range or parameter.

The term elastomeric ethylene/α-olefin copolymer shall include co-polymers contain from 15 to 80 wt % of ethylene, from 0 to 15 wt % of a polyene, preferably non-conjugated dienes and/or trienes, and the balance being a $C_3$-$C_{10}$ alpha olefin, in particular propylene.

Preferred are ethylene-propylene rubbers, so called EPM rubbers, in particular having 15 to 80 wt % of ethylene, the balance is propylene.

Other α-olefins than propylene suitable to form a copolymer include 1-butene, 1-pentene, 1-hexene, 1-octene and styrene, branched chain α-olefins such as 4-methylbut-1-ene, 5-methylpent-1-ene, 6-methylhept-1-ene, or mixtures of said α-olefins.

The polyene monomer may be selected from non-conjugated dienes and trienes. The copolymerization of diene or triene monomers allows introduction of one or more unsaturated bonds.

The non-conjugated diene monomer preferably has from 5 to 14 carbon atoms. Preferably, the diene monomer is characterized by the presence of a vinyl or norbornene group in its structure and can include cyclic and bicyclo compounds. Representative diene monomers include 1,4-hexadiene, 1,4-cyclohexadiene, 1,5-hexadiene, 1,6-heptadiene, 1,7-octadiene, dicyclopentadiene, 5-ethylidene-2-norbornene, 5-vinyl-2-norbornene, 5-methylene-2-norbornene, 1,5-heptadiene, and 1,6-octadiene. The copolymer may comprise a mixture of more than one diene monomer. Preferred non-conjugated diene monomers for preparing a copolymer are 1,4-hexadiene (HD), dicyclopentadiene (DCPD), 5-ethylidene-2-norbornene (ENB) and 5-vinyl-2-norbornene (VNB). ENB is the most preferred polyene.

The triene monomer will have at least two non-conjugated double bonds, and preferably up to about 30 carbon atoms. Typical triene monomers useful in the copolymer of the invention are 1-isopropylidene-3,4,7,7-tetrahydroindene, 1 isopropylidene-dicyclo-pentadiene, dihydro-isodicyclopentadiene, 2-(2-methylene-4-methyl-3-pentenyl) [2.2.1] bicyclo-5-heptene, 5,9-dimethyl-1,4,8-decatriene, 6,10-dimethyl-1,5,9-undecatriene, 4-ethylidene-6,7-dimethyl-1,6-octadiene and 3,4,8-trimethyl-1,4,7-nonatriene.

Ethylene-propylene or higher α-olefin copolymers preferably comprise about 10 to 90 wt. %, preferably 30 to 90 wt. %, more preferably 40 to 80 wt %, in particular 45 to 75 wt. % ethylene derived units, 0.01 to 20 wt. %, preferably 0.5 to 15 wt. %, or more preferably 1 to 10 wt. % polyene-derived units, wherein the balance to 100 wt. % is the amount of the C3 to C10 α-olefin derived units.

A preferred elastomeric polymer is an ethylene α-olefin diene rubber obtainable by random copolymerization of ethylene, an α-olefin having 3 to 10 carbon atoms, in particular propylene and a diene selected from the group consisting of 1,4-hexadiene (HD), dicyclopentadiene (DCPD), 5-ethylidene-2-norbornene (ENB) and 5-vinyl-2-norbornene (VNB), in particular ENB or VNB or ENB and VNB.

In one preferred embodiment the elastomeric ethylene/α-olefin copolymer is selected from the group consisting of ethylene-propylene-diene M-class rubbers (EPDM) and ethylene-propylene copolymer.

In one embodiment the organic medium comprising at least one elastomeric ethylene/α-olefin copolymer and an organic diluent is obtained from a polymerization reaction or a post-polymerization reaction.

Where the organic medium comprising at least one elastomeric ethylene/α-olefin copolymer and an organic diluent is obtained from a polymerization reaction the medium may further contain residual monomers of the polymerization reaction.

The aqueous medium may contain:
salts such as further conventional anti-agglomerants in particular salts of metal ions such as carboxylates, sodium salt of a maleic anhydride copolymer, also a multivalent ion, preferably Ca, like in the form of calcium chloride
layered silica, like talcum,
non-LCST compounds as defined above In one embodiment the aqueous medium therefore contains of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of mono- or multivalent metal ions calculated on their metal content and with respect to the amount of elastomer present in the medium obtained according to step B).

In yet another embodiment, the aqueous medium comprises 70 ppm or less, preferably 50 ppm or less, more preferably 30 ppm or less and even more preferably 20 ppm or less and yet even more preferably 10 ppm or less of salts of mono- or multivalent metal ions calculated on their metal content and with respect to the amount of elastomer present in the medium obtained according to step B).

In yet another embodiment, the aqueous medium comprises 25 ppm or less, preferably 10 ppm or less, more preferably 8 ppm or less and even more preferably 7 ppm or less and yet even more preferably 5 ppm or less of salts of mono- or multivalent metal ions calculated on their metal content and with respect to the amount of elastomer present in the medium obtained according to step B).

In a preferred embodiment thereof the salts of multivalent metal ions are calcium stearate and/or zinc stearate and/or calcium palmitate and/or zinc palmitate If not mentioned otherwise any amounts given in ppm refer to wt.-ppm.

In another embodiment the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of carboxylic acid salts of monovalent metal ions calculated on their metal content and with respect to the amount of elastomer present in the medium obtained according to step B).

In another embodiment the aqueous medium comprises 250 ppm or less, preferably 200 ppm or less, more preferably 100 ppm or less, even more preferably 50 ppm or less and yet even more preferably 25 ppm or less and in another yet even more preferred embodiment 100 ppm or less of talcum calculated on with respect to the amount of elastomer present in the medium obtained according to step B).

In another embodiment the aqueous medium comprises 250 ppm or less, preferably 200 ppm or less, more preferably 100 ppm or less, even more preferably 50 ppm or less and yet even more preferably 25 ppm or less and in another yet even more preferred embodiment 100 ppm or less of layered silicate calculated with respect to the amount of elastomer present in the medium obtained according to step B).

In yet another embodiment, the aqueous medium comprises 25 ppm or less, preferably 10 ppm or less, more preferably 8 ppm or less and even more preferably 7 ppm or less and yet even more preferably 5 ppm or less of salts of talcum calculated with respect to the amount of elastomer present in the medium obtained according to step B).

The following example shows how the calculation is performed.

The molecular weight of calcium stearate ($C_{36}H_{70}CaO_4$) is 607.04 g/mol. The atomic weight of calcium metal is 40.08 g/mol. In order to provide e.g. 1 kg of an aqueous medium comprising 550 ppm of a salts of a multivalent metal ion (calcium stearate) calculated on its metal content (calcium) and with respect to the amount of elastomer present in the medium obtained according to step b) that is sufficient to form a slurry from a medium obtained according to step b) comprising 10 g of a elastomer the aqueous medium must comprise (607.04/40.08)×(550 ppm of 10 g)=83 mg of calcium stearate or 0.83 wt.-% with respect to the elastomer or 83 ppm with respect to the aqueous medium. The weight ratio of aqeous medium to elastomer present in the medium obtained according to step b) would in this case be 100:1.

The term multivalent metal ions encompasses in particular bivalent earth alkaline metal ions such as magnesium, calcium, strontium and barium, preferably magnesium and calcium, trivalent metal ions of group 13 such as aluminium, multivalent metal ions of groups 3 to 12 in particular the bivalent metal ion of zinc.

The term "plurality" denotes an integer of at least two, preferably at least 20, more preferably at least 100.

The term elastomer particles denote discrete particles of any form and consistency, which in a preferred embodiment have a particle size of between 0.05 mm and 25 mm, more preferably between 0.1 and 20 mm.

In one embodiment the weight average particle size of the rubber particles is from 0.3 to 10.0 mm.

It is apparent to those skilled in the art, that the elastomer particles formed according to the invention may still contain organic diluent and further may contain water encapsulated within the elastomer particle.

In one embodiment the elastomer particles contain 90 wt.-% or more of the elastomer calculated on the sum of organic diluent, monomers and elastomer, preferably 93 wt.-% or more, more preferably 94 wt.-% or more and even more preferably 96 wt.-% or more.

As mentioned above elastomer particles are often referred to as "crumbs" in the literature. Typically the elastomer particles or crumbs have non-uniform shape and/or geometry.

The term aqueous medium denotes a medium comprising 80 wt.-% or more of water, preferably 90 wt.-% or more 80 wt.-% and even more preferably 95 wt.-% or more of water.

The remainder to 100 wt.-% may include salts including salts of monovalent and multivalent metal ions and organic diluents to the extent dissolvable in the aqueous medium.

In one embodiment the weight average molecular weight of the elastomer is in the range of from 10 to 2,000 kg/mol, preferably in the range of from 20 to 1,000 kg/mol, more preferably in the range of from 50 to 1,000 kg/mol, even more preferably in the range of from 100 to 800 kg/mol, yet more preferably in the range of from 100 to 550 kg/mol, and most preferably in the range of from 100 to 500 kg/mol. Molecular weights are obtained using gel permeation chromatography in tetrahydrofuran (THF) solution using polystyrene molecular weight standards if not mentioned otherwise.

In one embodiment the polydispersity of the elastomers according to the invention is in the range of 2 to 6 as measured by the ratio of weight average molecular weight to number average molecular weight as determined by gel permeation chromatography.

The elastomer has a Mooney viscosity of at least 10 (ML 1+4 at 125° C., ASTM D 1646), preferably of from 20 to 120 and even more preferably of from 25 to 90 (ML 1+4 at 125° C., ASTM D 1646).

In one embodiment the organic medium is obtained by a process comprising at least the steps of:
a) providing a reaction medium comprising an organic diluent, and at least one polymerizable monomer,
b) polymerizing the monomers within the reaction medium in the presence of a catalyst system form an organic medium comprising the elastomeric ethylene/α-olefin copolymer, the organic diluent and optionally residual monomers.

In one preferred embodiment the organic medium is obtained by a process comprising at least the steps of:
a) providing a reaction medium comprising an organic diluent, and two monomers in particular ethylene and an α-olefin, in particular propylene for an EPM and in addition at least one polyene monomer for an ethylene-α-olefin-diene copolymer
b) polymerizing the monomers within the reaction medium in the presence of an catalyst system to form an organic medium comprising the elastomeric ethylene/α-olefin copolymer, the organic diluent and optionally residual monomers.

Monomers

In this embodiment in step a) a reaction medium comprising an organic diluent, and at least two monomers as mentioned above, whereby the preferred monomers are also defined above.

The total monomer concentration of ethylene, α-olefin and optionally polyene in the reactor system typically varies between 1 and 55 wt %, depending o.a. on the specific process (solution or slurry process), catalyst used. In one embodiment the total monomer concentration varies between 25 and 40 wt %. In another embodiment between 1 and 15 wt % and in another between 20 and 60 wt %.

In one embodiment the monomers are purified before use in step a), in particular when they are recycled from step d). Purification of monomers may be carried out by passing through adsorbent columns containing suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis.

Organic Diluents

The term organic diluent generally encompasses diluting or dissolving organic chemicals which are liquid under reactions conditions. Any suitable organic diluent may be used which does not or not to any appreciable extent react with monomers or components of the initiator system.

However, those skilled in the art are aware that interactions between the diluent and monomers or components of the catalyst may occur.

Additionally, the term organic diluent includes mixtures of at least two diluents.

Examples of organic diluents include hydrocarbons, preferably alkanes which in a further preferred embodiment are those selected from the group consisting of propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis-1,2-dimethylcyclopentane, trans-1,2-dimethylcyclopentane, trans-1,3-dimethylcyclopentane, ethylcyclopentane, cyclohexane, methylcyclohexane. Further examples of hydrocarbon diluents include benzene, toluene, xylene, ortho-xylene, para-xylene and meta-xylene. In another preferred in a further preferred embodiment are those selected from the group consisting of propane, butane, hexane, cyclohexane, toluene and other hydrocarbons in the C5-C8 range.

Depending on the nature of the polymerization intended for step b) the organic diluent is selected to allow a slurry polymerization or a solution polymerization.

Catalyst Systems

The elastomeric ethylene-α-olefin copolymer, is usually and conveniently prepared using a Ziegler-Natta catalyst, a metallocene catalyst or other single site catalysts.

The ZN catalyst system that may be used in the process according to the invention comprises a transition metal compound and an organometallic compound. In addition, other components may be present, such as Lewis bases. Examples of suitable Lewis bases are: ammonia, amines, pyridines, ethers and esters.

The transition metal compound contains a metal chosen from the Groups 3, 4, 5 or 6. More than one (1) transition metal compound may be present in the catalyst composition. Preference is given to a metal from Group 5, more preference being given to vanadium.

Examples of suitable vanadium compounds are $VCl_4$, $VCl_3$,
  $VCl_3.3THF$ (with THF being a tetrahydrofuran group),
  $V(acac)_3$ (with acac being an acetylacetonylgroup),
  $Cp_2VCl$ (with Cp being a substituted or unsubstituted cyclopentadenyl group, indenyl group, tetrahydroindenyl group or fluorenyl group), $VOCl_x(OR')_{3-x}$ (with R' being a substituted or unsubstituted alkyl group with 1-20 C atoms, $0 \leq x \leq 3$).

The organometallic compound contains a metal chosen from Group 1, 2, 12 or 13. More than one (1) organometallic compound may be present in the catalyst composition. Preferably, at least one of the organometallic compounds contains aluminium. This organoaluminium compound preferably satisfies the formula R'3nAlYn, where $0 \leq n \leq 2$ R'=substituted or unsubstituted alkyl group with 1-20 C atoms and Y=halogen, alkoxy-group with 1-20 C atoms. Examples of suitable organoaluminium compounds are triethyl aluminium, triisobutyl aluminium, trioctyl aluminium, diethyl aluminium ethoxide, diisobutyl aluminium chloride, dimethyl aluminium chloride, diethyl aluminium chloride, methyl aluminium dichloride, ethyl aluminium dichloride, isobutyl aluminium dichloride, isobutyl aluminium sesquichloride, ethyl aluminium sesquichloride, etc. Preference is given to diethyl aluminium chloride and ethyl aluminium sesquichloride.

Polymerization Conditions

In one embodiment, the organic diluent and the monomers employed are substantially free of water. As used herein substantially free of water is defined as less than 50 ppm based upon total weight of the reaction medium, preferably less than 30 ppm, more preferably less than 20 ppm, even more preferably less than 10 ppm, yet even more preferably less than 1 ppm.

Steps a) and/or b) may be carried out in continuous or batch processes, whereby continuous processes are preferred.

In an embodiment of the invention the polymerization according to step b) is effected using a polymerization reactor. Suitable reactors are those known to the skilled in the art and include flow-through polymerization reactors, plug flow reactor, stirred tank reactors, moving belt or drum reactors, jet or nozzle reactors, tubular reactors, and autorefrigerated boiling-pool reactors.

Depending on the choice of the organic diluent the polymerization according to step b) is carried out either as slurry polymerization or solution polymerization.

In slurry polymerization, the monomers, the catalyst system are all typically soluble in the diluent or diluent mixture, i.e., constitute a single phase, while the elastomer upon formation precipitates from the organic diluent.

In solution polymerization, the monomers, the catalyst system are all typically soluble in the diluent or diluent mixture, i.e., constitute a single phase as is the elastomer formed during polymerization.

The solubilities of the desired polymers in the organic diluents described above as well as their swelling behaviour under reaction conditions is well known to those skilled in the art.

The advantages and disadvantages of solution versus slurry polymerization are exhaustively discussed in the literature and thus are also known to those skilled in the art.

In the elastomeric ethylene/α-olefin copolymer production process reaction temperatures vary o.a. depending on the chosen process: solution process or slurry process, completely liquid filled reactors or gas/liquid reactors, catalyst technology (ZN, metallocene, ACE) and required product properties (i.e Mooney). Reactor temperatures typically vary between 10° C. and 130° C.

The reaction pressure is also dependent on the chosen process and diluent and varies typically between 5 barg and 32 barg The polymerization according to step b) is typically carried out in a manner that the solids content of the cement (solution process) resp. slurry (slurry process) in step b) is preferably in the range of 5-14 wt % and 20-40 wt % respectively.

As used herein the terms "solids content" or "solids level" refer to weight percent of the elastomeric ethylene/α-olefin copolymer obtained according to step b) i.e. in polymerization and present in the medium comprising the elastomer, the organic diluent and optionally residual monomers obtained according to step b).

In one embodiment the reaction time in step b) is from 2 min to 2 h, preferably from 10 min to 1 h and more preferably from 20 to 45 min.

The process may be carried out batchwise or continuously. Where a continuous reaction is performed the reaction time given above represents the average residence time.

The conversion of the monomers is dependent on the nature of the monomers itself (ethylene, propylene, diene), the catalyst system, residence times and other chosen process conditions and vary in steady state situation typically between 8 and 95 wt % as well as for the solution process as the slurry process.

In step A) the organic medium, for example those obtained according to step b), is contacted with an aqueous medium comprising at least one LCST compound having a cloud point of 0 to 100° C., preferably 5 to 100° C., more preferably 15 to 80° C. and even more preferably 20 to 70° C. and removing at least partially the organic diluent to obtain the aqueous slurry comprising the plurality elastomer particles.

The contact can be performed in any vessel suitable for this purpose. In industry such contact is typically performed in a flash drum or any other vessel known for separation of a liquid phase and vapours. Also preferred is to add the LCST compound as an aqueous solution to the feed stream to the reaction mixture before entering the vessel for separation of the liquid phase and vapours.

Removal of organic diluent may also employ other types of distillation so to subsequently or jointly remove the residual monomers and the organic diluent to the desired extent. Distillation processes to separate liquids of different boiling points are well known in the art and are described in, for example, the *Encyclopedia of Chemical Technology*, Kirk Othmer, 4th Edition, pp. 8-311, which is incorporated herein by reference. Generally, the organic diluent may either be seperatly or jointly be recycled into a step a) of a polymerization reaction.

The pressure in step A) and in one embodiment the flash drum depends on the organic diluent and monomers employed in step b) but is typically in the range of from 100 hPa to 5,000 hPa.

The temperature in step A) is selected to be sufficient to at least partially remove the organic diluent.

Temperatures vary depending on the specific diluent used in the process, the specific diluent removal system (o.a. residence times, energy efficieny), downstream processing equipment, environmental impact. Typical temperatures vary between 75° C. and 140° C., but are not limited to this range.

Upon contact of the medium obtained according to step b) with the aqueous medium comprising at least one LCST compound, the medium is destabilized due to removal of the stabilizing organic diluent thereby forming elastomer particles suspended in the aqueous slurry.

According to the observations of the applicant and without wanting to be bound by theory a further consequence is that the at least LCST compound as earlier observed for conventional anti-agglomerants such as salts of carboxylates, talcum and/or non-ionic surfactant, the aqueous medium containing the at least one LCST compound depletes from LCST compounds so that in the final aqueous slurry at least a part, according to the observations disclosed in the experimental part a substantial part of the LCST compounds are part of the elastomer particles and are presumably bound to the surface of the elastomer particles causing the tremendous anti-agglomerating effect. Suitable LCST compounds are for example selected from the group consisting of:

poly(N-isopropylacrylamide), poly(N-isopropylacrylamide-co-N,N-dimethylacrylamide, poly(N-isopropylacrylamide)-alt-2-hydroxyethylmethacrylate, poly(N-vinylcaprolactam), poly(N,N-diethylacrylamide), poly[2-(dimethylamino)ethyl methacrylate], poly(2-oxazoline) glyelastomers, Poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, preferably those with 2 to 6 ethylene glycol units and 2 to 6 polypropylene units, compounds of formula (I)

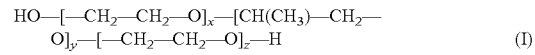

with y=3 to 10 and x and z=1 to 8, whereby y+x+z is from 5 to 18, polyethyleneglycol-co-polypropylene glycol, preferably those with 2 to 8 ethylene glycol units and 2 to 8 polypropylene units, ethoxylated iso-$C_{13}H_{27}$-alcohols, preferably with an ethoxylation degree of 4 to 8, polyethylene glycol with 4 to 50, preferably 4 to 20 ethyleneglycol units, polypropylene glycol with 4 to 30, preferably 4 to 15 propyleneglycol units, polyethylene glycol monomethyl, dimethyl, monoethyl and diethyl ether with 4 to 50, preferably 4 to 20 ethyleneglycol units, polypropylene glycol monomethyl, dimethyl, monoethyl and diethyl ether with 4 to 50, preferably 4 to 20 propyleneglycol units, whereby methyl cellulose, hydroxypropyl cellulose, hydroxyethyl methylcellulose and hydroxypropyl methylcellulose are preferred.

In one embodiment methyl cellulose, hydroxypropyl cellulose, hydroxyethyl methylcellulose and hydroxypropyl methylcellulose have a degree of substitution of from 0.5 to 2.8 the theoretical maximum being 3, preferably 1.2 to 2.5 and more preferably 1.5 to 2.0.

In one embodiment hydroxypropyl cellulose, hydroxyethyl methylcellulose and hydroxypropyl methylcellulose have a MS (moles of substitution) of from 3, preferably of from 4 with respect to ethylene glycol or propylene glycol groups per glucose unit.

The amount of LCST compound(s) present in the aquous medium employed above is for example of from 1 to 20,000 ppm, preferably 3 to 10,000 ppm, more preferably 5 to 5,000 ppm and even more preferably 10 to 5,000 ppm with respect to the amount of elastomer present in the medium obtained according to step b).

In one embodiment the LCST compounds exhibit a molecular weight of at least 1,500 g/mol, preferably at least 2,500 g/mol and more preferably at least 4,000 g/mol.

Where a mixture of different LCST compounds is applied the weight average molecular weight is for example of from 1,500 to 2,000,000.

The unique capability of the LCST compounds to stabilize elastomer particles in aqueous solution is a major finding of the invention. The invention therefore also encompasses a method to prevent or reduce or to slow-down agglomeration of slurries comprising elastomer particles suspended in aqueous media by addition or use of LCST compounds having a cloud point of 0 to 100° C., preferably 5 to 100° C., more preferably 15 to 80° C. and even more preferably 20 to 70° C.

For the avoidance of doubt it is noted that the aqueous slurry obtained in step A) is distinct from and unrelated to the polymerization slurry or cement that may be obtained in some embodiments described in step b).

In case step b) was carried out as solution polymerization upon contact with water the organic diluent is evaporated and the elastomer forms elastomer particles suspended in the aqueous slurry.

The at least partial removal of the organic diluent typically requires significant amounts of heat to balance the heat of evaporation which can be provided for example by heating the vessel wherein LCST compound is added either from outside or in a preferred embodiment additionally or alternatively by introducing steam which further aids removal of organic diluent (steam stripping).

Step A) may be carried out batchwise or continuously, whereby a continuous operation is preferred.

The temperature in step A) varies typically between 75° C. and 140° C. Even found not to be necessary in one embodiment the temperature in step A) is above the highest determined cloud point of at least one LCST compound employed.

Highest determined cloud point means the highest cloud point measured with the three methods disclosed above. If a cloud point cannot be determined for whatever reason with one or two methods the highest cloud point of the other determinations is taken as the highest determined cloud point.

In one embodiment the removal of the organic diluent is performed until the aqueous slurry contains less than 10 wt.-% of organic diluent calculated on the elastomer contained in the elastomer particles of the resulting aqueous slurry, preferably less than 7 wt.-% and even more preferably less than 5 wt.-% and yet even more preferably less than 2 wt.-%.

It was not known before and is highly surprising that an aqueous slurry comprising a plurality of elastomeric ethylene/α-olefin copolymer with very low levels or even absence of salts of multivalent metal ions or talcum or non-ionic surfactant can be obtained at all.

Therefore, the use of LCST compounds having a cloud point of 0 to 100° C., preferably 5 to 100° C., more preferably 15 to 80° C. and even more preferably 20 to 70° C. as anti-agglomerant, in particular for elastomer particles as defined is encompassed by the invention as well.

The aqueous slurries disclosed hereinabove and as obtainable according to step A) as such are therefore also encompassed by the invention.

The aqueous slurries obtained after the addition of the LCST compound serve as an ideal starting material to obtain the elastomer particles in isolated form.

Therefore, in a further step B) the elastomer particles contained in the aqueous slurry obtained according to step A) may be separated to obtain the elastomer particles.

The separation may be effected by flotation, centrifugation, filtration, dewatering in a dewatering extruder or by any other means known to those skilled in the art for the separation of solids from fluids.

In a preferred embodiment the process according to the present invention comprising further step C) wherein the elastomeric ethylene/α-olefin copolymer particles contained in the aqueous slurry obtained according to step B) are separated to obtain isolated elastomer particles and further step D) wherein the (isolated) elastomer particles are dried, preferably to a residual content of volatiles of 7,000 or less, preferably 5,000 or less, even more preferably 4,000 or less and in onother embodiment 2,000 ppm or less, preferably 1,000 ppm or less.

As used herein the term volatiles denotes compounds having a boiling point of below 250° C. at standard pressure and include water as well as remaining organic diluents.

Drying can be performed using conventional means known to those in the art, which includes drying on a heated mesh conveyor belt.

The dewatering and drying finishing operations for rubber crumbs typically include passing a crumb slurry from a diluent stripping section over a dewatering screen, to a expeller, and then to a expander. The rubber which enters the drying extruder generally contains about 4 to about 10% volatile matter. The rubber-water mixture is heated in the extruder by mechanical work upstream of the extruder die. Preferably thereafter additional LCST compound is added to the thus predried elastomeric ethylene/α-olefin copolymer formed. Even more preferred therafter a final drying step is following. The addition of the LCST compound is performed preferably as aqueous solution or in dry form to the r elastomeric ethylene/α-olefin copolymer as mentioned above.

In one embodiment the elastomeric ethylene/α-olefin copolymer therefore contains of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of mono- or multivalent metal ions calculated on their metal content and with respect to the amount of elastomeric ethylene/α-olefin copolymer.

In another embodiment the aqueous medium comprises 250 ppm or less, preferably 200 ppm or less, more preferably 100 ppm or less, even more preferably 50 ppm or less and yet even more preferably 25 ppm or less and in another yet even more preferred embodiment 100 ppm or less of layered silicate calculated with respect to the amount of elastomeric ethylene/α-olefin copolymer.

In yet another embodiment, the aqueous medium comprises 25 ppm or less, preferably 10 ppm or less, more preferably 8 ppm or less and even more preferably 7 ppm or less and yet even more preferably 5 ppm or less of salts of talcum calculated with respect to the amount of elastomeric ethylene/α-olefin copolymer.

Depending on the drying process the elastomer particles may also be brought into a different shape hereinafter referred to as reshaped elastomer particles. Reshaped elastomer particles are for example pellets. Such reshaped elastomer particles are also encompassed by the invention and for example obtained by drying in an extruder followed by pelletizing at the extruder outlet. Such pelletizing may also be performed under water. The process according to the invention allows preparation of elastomer particles and reshaped elastomer particles having an unprecedented low level of multivalent metal ions.

The invention also relates to aqueous slurry obtainable according to a process of the present invention.

The invention also related to the use of LCST compounds having a cloud point of 0 to 100° C., preferably 5 to 100° C., more preferably 15 to 80° C. and even more preferably 20 to 70° C. as anti-agglomerant, in particular for elastomeric ethylene/α-olefin copolymer particles.

The invention also relates to a method to prevent or reduce or to slow-down agglomeration of slurries comprising elastomeric ethylene/α-olefin copolymer particles suspended in aqueous media by addition or use of LCST compounds having a cloud point of 0 to 100° C., preferably 5 to 100° C., more preferably 15 to 80° C. and even more preferably 20 to 70° C.

The invention also relates to an elastomeric ethylene/α-olefin copolymer particles having a elastomeric ethylene/α-olefin copolymer content of 98.5 wt.-% or more, preferably 98.8 wt.-% or more, more preferably 99.0 wt.-% or more even more preferably 99.2 wt.-% or more, yet even more preferably 99.4 wt.-% or more and in another embodiment 99.5 wt.-% or more.

Preferably the elastomeric ethylene/α-olefin copolymer particles according to the present invention has a weight average molecular weight in the range of from 10 to 2,000 kg/mol, preferably in the range of from 20 to 1,000 kg/mol, more preferably in the range of from 50 to 1,000 kg/mol, even more preferably in the range of from 100 to 800 kg/mol, yet more preferably in the range of from 100 to 550 kg/mol, and most preferably in the range of from 100 to 500 kg/mol, whereby molecular weights are obtained using gel permeation chromatography in tetrahydrofuran (THF) solution using polystyrene molecular weight.

Preferably the elastomeric ethylene/α-olefin copolymer particles according to the present invention has a Mooney viscosity of at least 10 (ML 1+4 at 125° C., ASTM D 1646), preferably of from 20 to 120 and even more preferably of from 25 to 90 (ML 1+4 at 125° C., ASTM D 1646).

Preferably the elastomeric ethylene/α-olefin copolymer particles according to the present invention further comprise 0 to 0.4 wt.-%, preferably 0 to 0.2 wt.-%, more preferably 0 to 0.1 wt.-% and more preferably 0 to 0.05 wt.-% of salts of multivalent metal ions, prefably stearates and palmitates of multivalent metal ions.

Preferably the elastomeric ethylene/α-olefin copolymer particles according to the present invention further comprise 1 ppm to 18,000 ppm, preferably 1 ppm to 5,000 ppm, more preferably from 1 ppm to 2,000 ppm and in a more preferred embodiment from 5 to 1,000 ppm or from 5 to 500 ppm of at least one LCST compound.

The invention therefore encompasses (reshaped) elastomer particles having a elastomer content of 98.5 wt.-% or more, preferably 98.8 wt.-% or more, more preferably, 99.0 wt.-% or more even more preferably 99.2 wt.-% or more, yet even more preferably 99.4 wt.-% or more and in another embodiment 99.5 wt.-% or more.

In another aspect the invention provides elastomer particles comprising salts of multivalent metal ions in an amount of 550 ppm or less, preferably 400 ppm or less, more preferably 250 ppm or less, even more preferably 150 ppm or less and yet even more preferably 100 ppm or less and in an even more preferred embodiment 50 ppm or less calculated on their metal content.

The elastomer particles according to the invention may further comprise antioxidants such as 2,6-di-tert.-butyl-4-methyl-phenol (BHT), pentaerythrol-tetrakis-[3-(3,5-di-tert.-butyl-4-hydroxphenyl)-propanoic acid (also known as Irganox® 1010), Irganox 1076, for example in an amount of from 50 ppm to 5000 ppm, typically ppm to 750 ppm.

Typically the remainder to 100 wt.-% include the LCST compound(s), volatiles, surfactants and so called "ash content". In one embodiment the amount of LCST compounds present in the elastomer particles is from 1 ppm to 18,000 ppm, preferably of from 1 ppm to 10,000 ppm, more preferably 1 ppm to 5,000 ppm, even more preferably from 1 ppm to 2,000 ppm and in a more preferred embodiment from 5 to 1,000 ppm or from 5 to 500 ppm.

In one embodiment the amount of salts of monovalent metal ions present in the elastomer particles is from 1 ppm to 1,000 ppm, preferably from 10 ppm to 500 ppm and in a more preferred embodiment from 10 to 200 ppm.

In one embodiment the amount of stearates or palmitates of multivalent metal ions present in the elastomer particles is 0 to 4,000 ppm, preferably 0 to 2,000 ppm, more preferably 0 to 1,000 ppm and in a more preferred embodiment from 0 to 500 ppm.

In one embodiment the invention therefore encompasses (reshaped) elastomer particles comprising
a) 98.5 wt.-% or more, preferably 98.8 wt.-% or more, more preferably 99.0 wt.-% or more even more preferably 99.2 wt.-% or more, yet even more preferably 99.4 wt.-% or more and in another embodiment 99.5 wt.-% or more of a elastomer
b) 0 to 0.5 wt.-%, preferably 0 to 0.2 wt.-%, more preferably 0 to 0.1 wt.-% and more preferably 0 to 0.05 wt.-% in total of salts of multivalent metal ions, preferably stearates, palmitates and carboxylates of multivalent metal ions, and layered silca, preferably talcum.

In another embodiment the invention encompasses (reshaped) elastomer particles comprising
a) 98.5 wt.-% or more, preferably 98.8 wt.-% or more, more preferably 99.0 wt.-% or more even more preferably 99.2 wt.-% or more, yet even more preferably 99.4 wt.-% or more and in another embodiment 99.5 wt.-% or more of a elastomer
b) 1 ppm to 18,000 ppm, preferably of from 1 ppm to 10,000 ppm, more preferably 1 ppm to 5,000 ppm, even more preferably from 1 ppm to 2,000 ppm and in a more preferred embodiment from 5 to 1,000 ppm or from 5 to 500 ppm of a least one LCST compound.

In yet another embodiment the invention encompasses (reshaped) elastomer particles comprising
a) 98.5 wt.-% or more, preferably 98.8 wt.-% or more, more preferably 99.0 wt.-% or more even more preferably 99.2 wt.-% or more, yet even more preferably 99.4 wt.-% or more and in another embodiment 99.5 wt.-% or more of a elastomer
b) 1 ppm to 18,000 ppm, preferably of from 1 ppm to 10,000 ppm, more preferably 1 ppm to 5,000 ppm, even more preferably from 1 ppm to 2,000 ppm and in a more preferred embodiment from 5 to 1,000 ppm or from 5 to 500 ppm of a least one LCST compound and
c) 0 to 0.4 wt.-%, preferably 0 to 0.2 wt.-%, more preferably 0 to 0.1 wt.-% and more preferably 0 to 0.05 wt.-% in total of salts of mono- or multivalent metal ions, prefably stearates and palmitates of mono- or multivalent metal ions, and layered silicate, preferably talcum.

In yet another embodiment the invention encompasses (reshaped) elastomer particles comprising I) 100 parts by weight of a elastomer II) 0.0001 to 0.5, preferably 0.0001 to 0.2, more preferably 0.0005 to 0.1, even more preferably 0.0005 to 0.05 parts by weight of a least one LCST compound and III) no or from 0.0001 to 3.0, preferably no or from 0.0001 to 2.0, more preferably no or from 0.0001 to 1.0, even more preferably no or from 0.0001 to 0.5, yet even more preferably no or from 0.0001 to 0.3, and most preferably no or from 0.0001 to 0.2 parts by weight of total of salts of mono- or multivalent metal ions, prefably stearates and palmitates of mono- or multivalent metal ions, and layered silicate, preferably talcum and IV) no or from 0.005 to 0.1, preferably from 0.008 to 0.05, more preferably from 0.03 to 0.07 parts by weight of antioxidants V) from 0.005 to 0.5, preferably from 0.01 to 0.3, more preferably from 0.05 to 0.2 parts by weight of volatiles having a boiling point at standard pressure of 200° C. or less.

Preferably the aforementioned components I) to V) add up to 100.00501 to 104.100000 parts by weight, preferably from 100.01 to 103.00 parts by weight, more preferably from 100.10 to 101.50 parts by weight, even more preferably from 100.10 to 100.80 parts by weight and together represent 99.80 to 100.00 wt.-%, preferably 99.90 to 100.00 wt.-%, more preferably 99.95 to 100.00 wt.-% and yet even more preferably 99.97 to 100.00 wt.-% of the total weight of the (reshaped) elastomer particles.

The elastomer particles obtained according to the invention typically appear as a light and crumbly material.

In one embodiment the elastomer particles exhibit a bulk density of from 0.05 kg/l to 0.800 kg/l.

In a further step D) the elastomer particles obtained in step C) are subjected to a shaping process such as baling.

The invention therefore encompasses a shaped article in particular a bale obtainable by shaping, in particular baling the elastomer particles obtained in step D). Shaping can be performed using any standard equipment known to those skilled in the art for such purposes. Baling can e.g. performed with conventional, commercially available balers.

In one embodiment the shaped article in particular the bale exhibits a density of from 0.700 kg/l to 0.850 kg/l.

In another embodiment the shaped article is cuboid and has a weight of from 10 to 50 kg, preferably 25 to 40 kg.

It is apparent for those skilled in the art, that the density of the shaped article in particular the bale is higher than the bulk density of the elastomer particles employed for its production.

Blends

The elastomer particles, reshaped polymer particles and shaped articles made from (reshaped) elastomer particles are hereinafter referred to as the elastomers according to the invention. One or more of the elastomers according to the invention may be blended either with each other or additionally or alternatively with at least one secondary rubber being different from the elastomer forming the elastomer particles, which is preferably selected from the group consisting of natural rubber (NR), epoxidized natural rubber (ENR), polyisoprene rubber, poly(styrene-co-butadiene) rubber (SBR), chloroprene rubber (CR), polybutadiene rubber (BR), perfluoroelastomer (FFKM/FFPM), ethylene vinylacetate (EVA) rubber, ethylene acrylate rubber, polysulphide rubber (TR), poly(isoprene-co-butadiene) rubber (IBR), styrene-isoprene-butadiene rubber (SIBR), polyphenylensulfide, nitrile-butadiene rubber (NBR), hydrogenated nitrile-butadiene rubber (HNBR), propylene oxide polymers, star-branched butyl rubber and halogenated star-branched butyl rubber, butyl rubbers which are not subject of the present invention i.e. having i.a. different levels of multivalent metal ions or purity grages, brominated butyl rubber and chlorinated butyl rubber, star-branched polyisobutylene rubber, star-branched brominated butyl (polyisobutylene/isoprene elastomer) rubber; poly(isobutylene-co-p-methylstyrene) and halogenated poly(isobutylene-co-p-methylstyrene), halogenated poly(isobutylene-co-isoprene-co-p-methylstyrene), poly(isobutylene-co-isoprene-co-styrene), halogenated poly(isobutylene-co-isoprene-co-styrene), poly(isobutylene-co-isoprene-co-alpha-methylstyrene), halogenated poly(isobutylene-co-isoprene-co-a-methylstyrene).

One or more of the elastomers according to the invention or the blends with secondary rubbers described above may be further blended additionally or alternatively for example simultaneously or seperately with at least one thermoplastic polymer, which is preferably selected from the group consisting of polyurethane (PU), polyacrylic esters (ACM, PMMA), thermoplastic polyester urethane (AU), thermoplastic polyether urethane (EU), perfluoroalkoxyalkane (PFA), polytetrafluoroethylene (PTFE), and polytetrafluoroethylene (PTFE).

One or more of the elastomers according to the invention or the blends with secondary rubbers and/or thermoplastic polymers described above may be compounded with one or more fillers. The fillers may be non-mineral fillers, mineral fillers or mixtures thereof. Non-mineral fillers are preferred in some embodiments and include, for example, carbon blacks, rubber gels and mixtures thereof. Suitable carbon blacks are preferably prepared by lamp black, furnace black or gas black processes. Carbon blacks preferably have BET specific surface areas of 20 to 200 $m^2/g$. Some specific examples of carbon blacks are SAF, ISAF, HAF, FEF and GPF carbon blacks. Rubber gels are preferably those based on polybutadiene, butadiene/styrene elastomers, butadiene/acrylonitrile elastomers or polychloroprene.

Suitable mineral fillers comprise, for example, silica, silicates, clay, bentonite, vermiculite, nontronite, beidelite, volkonskoite, hectorite, saponite, laponite, sauconite, magadiite, kenyaite, ledikite, gypsum, alumina, talc, glass, metal oxides (e.g. titanium dioxide, zinc oxide, magnesium oxide, aluminum oxide), metal carbonates (e.g. magnesium carbonate, calcium carbonate, zinc carbonate), metal hydroxides (e.g. aluminum hydroxide, magnesium hydroxide) or mixtures thereof.

Dried amorphous silica particles suitable for use as mineral fillers may have a mean agglomerate particle size in the range of from 1 to 100 microns, or 10 to 50 microns, or 10 to 25 microns. In one embodiment, less than 10 percent by volume of the agglomerate particles may be below 5 microns. In one embodiment, less than 10 percent by volume of the agglomerate particles may be over 50 microns in size. Suitable amorphous dried silica may have, for example, a BET surface area, measured in accordance with DIN (Deutsche Industrie Norm) 66131, of between 50 and 450 square meters per gram. DBP absorption, as measured in accordance with DIN 53601, may be between 150 and 400 grams per 100 grams of silica. A drying loss, as measured according to DIN ISO 787/11, may be from 0 to 10 percent by weight. Suitable silica fillers are commercially sold under the names HiSil™ 210, HiSil™ 233 and HiSil™ 243 available from PPG Industries Inc. Also suitable are Vulkasil™ S and Vulkasil™ N, commercially available from Bayer AG.

High aspect ratio fillers useful in the present invention may include clays, talcs, micas, etc. with an aspect ratio of at least 1:3. The fillers may include acircular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. The high aspect ratio fillers may have an aspect ratio of at least 1:5, or at least 1:7, or in a range of 1:7 to 1:200. High aspect ratio fillers may have, for example, a mean particle size in the range of from 0.001 to 100 microns, or 0.005 to 50 microns, or 0.01 to 10 microns. Suitable high aspect ratio fillers may have a BET surface area, measured in accordance with DIN (Deutsche Industrie Norm) 66131, of between 5 and 200 square meters per gram. The high aspect ratio filler may comprise a nanoclay, such as, for example, an organically modified nanoclay. Examples of nanoclays include natural powdered smectite clays (e.g. sodium or calcium montmorillonite) or synthetic clays (e.g. hydrotalcite or laponite). In one embodiment, the high aspect filler may include organically modified montmorillonite nanoclays. The clays may be modified by substitution of the transition metal for an onium ion, as is known in the art, to provide surfactant functionality to the clay that aids in the dispersion of the clay within the generally hydrophobic polymer environment. In one embodiment, onium ions are phosphorus based (e.g. phosphonium ions) or nitrogen based (e.g. ammonium ions) and contain functional groups having from 2 to 20 carbon atoms. The clays may be provided, for example, in nanometer scale particle sizes, such as, less than 25 μm by volume. The particle size may be in a range of from 1 to 50 μm, or 1 to 30 μm, or 2 to 20 μm. In addition to silica, the nanoclays may also contain some fraction of alumina. For example, the nanoclays may contain from 0.1 to 10 Wt.-% alumina, or 0.5 to 5 Wt.-% alumina, or 1 to 3 Wt.-% alumina. Examples of commercially available organically modified nanoclays as high aspect ratio mineral fillers include, for example, those sold under the trade name Cloisite® clays 10A, 20A, 6A, 15A, 30B, or 25A.

One or more of the elastomers according to the invention or the blends with secondary rubbers and/or thermoplastic polymers or the compounds described above are hereinafter collectively referred to as polymer products and may further contain other ingredients such as curing agents, reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. These ingredients are used in conventional amounts that depend, inter alia, on the intended use.

The polymer products may further contain a curing system which allows them to be cured.

The choice of curing system suitable for use is not particularly restricted and is within the purview of a person skilled in the art. In certain embodiments, the curing system may be sulphur-based, peroxide-based, resin-based or ultraviolet (UV) light-based.

A sulfur-based curing system may comprise: (i) a metal oxide, (ii) elemental sulfur and (iii) at least one sulfur-based accelerator. The use of metal oxides as a component in the sulphur curing system is well known in the art. A suitable metal oxide is zinc oxide, which may be used in the amount of from about 1 to about 10 phr. In another embodiment, the zinc oxide may be used in an amount of from about 2 to about 5 phr. Elemental sulfur, (component (ii)), is typically used in amounts of from about 0.2 to about 2 phr. Suitable sulfur-based accelerators (component (iii)) may be used in amounts of from about 0.5 to about 3 phr. Non-limiting examples of useful sulfur-based accelerators include thiuram sulfides (e.g. tetramethyl thiuram disulfide (TMTD)), thiocarbamates (e.g. zinc dimethyl dithiocarbamate (ZDC)) and thiazyl or benzothiazyl compounds (e.g. mercaptobenzothiazyl disulfide (MBTS)). A sulphur based accelerator of particular note is mercaptobenzothiazyl disulfide.

Depending on the specific nature an in particular the level of unsaturation of the elastomers according to the invention peroxide based curing systems may also be suitable. A peroxide-based curing system may comprises a peroxide curing agent, for example, dicumyl peroxide, di-tert-butyl peroxide, benzoyl peroxide, 2,2'-bis(tert.-butylperoxy diisopropylbenzene (Vulcup® 40KE), benzoyl peroxide, 2,5-dimethyl-2,5-di(tert-butylperoxy)-hexyne-3, 2,5-dimethyl-2,5-di(benzoylperoxy)hexane, (2,5-bis(tert-butylperoxy)-2, 5-dimethyl hexane and the like. One such peroxide curing agent comprises dicumyl peroxide and is commercially available under the name DiCup 40C. Peroxide curing agents may be used in an amount of about 0.2-7 phr, or about 1-6 phr, or about 4 phr. Peroxide curing co-agents may also be used. Suitable peroxide curing co-agents include, for example, triallyl isocyanurate (TAIC) commercially available under the name DIAK 7 from DuPont, N,N'-m-phenylene dimaleimide known as HVA-2 from DuPont or Dow), triallyl cyanurate (TAC) or liquid polybutadiene known as Ricon D 153 (supplied by Ricon Resins). Peroxide curing co-agents may be used in amounts equivalent to those of the peroxide curing agent, or less. The state of peroxide cured articles is enhanced with butyl polymers containing increased levels of unsaturation, for example a multiolefin content of at least 0.5 mol-%.

The polymer products may also be cured by the resin cure system and, if required, an accelerator to activate the resin cure. Suitable resins include but are not limited to phenolic resins, alkylphenolic resins, alkylated phenols, halogenated alkyl phenolic resins and mixtures thereof. The selection of the various components of the resin curing system and the required amounts are known to persons skilled in the art and depend upon the desired end use of the rubber compound. The resin cure as used in the vulcanization of elastomers containing unsaturation, and in particular for butyl rubber is described in detail in "Rubber Technology" Third Edition, Maurice Morton, ed., 1987, pages 13-14, 23, as well as in the patent literature, see, e.g., U.S. Pat. Nos. 3,287,440 and 4,059,651.

To the extent the polymer products disclosed above whether uncure or cured exhibit the levels of salts of multivalent metal ions, in particular the levels of stearates and palmitates of multivalent metal ions with respect to their contents of the elastomers according to the invention there are as such novel and consequently encompassed by the invention as well.

The invention further encompasses the use of the elastomers according to the invention to prepare the polymer products described above and a process for the preparation of the polymer products described above by blending or compounding the ingredients mentioned above.

Such ingredients may be compounded together using conventional compounding techniques. Suitable compounding techniques include, for example, mixing the ingredients together using, for example, an internal mixer (e.g. a Banbury mixer), a miniature internal mixer (e.g. a Haake or Brabender mixer) or a two roll mill mixer. An extruder also provides good mixing, and permits shorter mixing times. It is possible to carry out the mixing in two or more stages, and the mixing can be done in different apparatuses, for example one stage in an internal mixer and one stage in an extruder. For further information on compounding techniques, see Encyclopedia of Polymer Science and Engineering, Vol. 4, p. 66 et seq. (Compounding). Other techniques, as known to those of skill in the art, are further suitable for compounding.

It was surprisingly found that the elastomers according to the invention due to their low stearate concentration allow much better curing, in particular when resin cured as will be shown in the experimental part.

Applications

The polymer products according to the invention are highly useful in wide variety of applications. The low degree of permeability to gases, the unsaturation sites which may serve as crosslinking, curing or post polymerization modification site as well as their low degree of disturbing additives accounts for the largest uses of these rubbers.

Therefore, the invention also encompasses the use of the polymer products according to the invention for innerliners, bladders, tubes, air cushions, pneumatic springs, air bellows, accumulator bags, hoses, conveyor belts and pharmaceutical closures, wipers, roofing, window profiles, automotive door profiles. The invention further encompasses the aforementioned products comprising the polymer products according to the invention whether cured or/uncured.

The polymer products further exhibit high damping and have uniquely broad damping and shock absorption ranges in both temperature and frequency.

Therefore, the invention also encompasses the use of the polymer products according to the invention in automobile suspension bumpers, auto exhaust hangers, body mounts and shoe soles.

The polymer products of the instant invention are also useful in tire sidewalls and tread compounds. In sidewalls, the polymer characteristics impart good ozone resistance, crack cut growth, and appearance.

The polymer products may be shaped into a desired article prior to curing. Articles comprising the cured polymer products include, for example, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, etc.; a container closure or lid; a seal or sealant, such as a gasket or caulking; a material handling apparatus, such as an auger or conveyor belt; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing. Additional examples where the butyl ionomers may be used in articles or coatings include, but are not limited to, the following: appliances, baby products, bathroom fixtures, bathroom safety, flooring, food storage, garden, kitchen fixtures, kitchen products, office products, pet products, sealants and grouts, spas, water filtration and storage, equipment, food preparation surfaces and equipments, shopping carts, surface applications, storage containers, footwear, protective wear, sporting gear, carts, dental equipment, door knobs, clothing, telephones, toys, catheterized fluids in hospitals, surfaces of vessels and pipes, coatings, food processing, biomedical devices, filters, additives, computers, ship hulls, shower walls, tubing to minimize the problems of biofouling, pacemakers, implants, wound dressing, medical textiles, ice machines, water coolers, fruit juice dispensers, soft drink machines, piping, storage vessels, metering systems, valves, fittings, attachments, filter housings, linings, and barrier coatings.

The elastomeric ethylene/α-olefin copolymer are extremely useful as rubber articles in various fields. In the case where the elastomeric ethylene/α-olefin copolymer is foamed, an expansion ratio of 1.3 to 3.0 times is preferable for, for example, sponge materials for weatherstrips, and an expansion ratio of more than 3.0 times but not more than 30 times is preferable for, for example, highly foamed sponge materials used for heat-insulating sponge, dam rubber and the like. Examples of the elastomeric ethylene/α-olefin copolymer products include sponge materials for weatherstrips, such as a sponge for door sponge, a sponge for opening trim, a sponge for hood seal and a sponge for trunk seal; and highly foamed sponge materials, such as a heat-insulating sponge and a dam rubber.

In a preferred specific embodiment 1, the invention relates to a process for the preparation of an aqueous slurry comprising a plurality of elastomer particles suspended therein, the process comprising at least the step of:

A*) contacting an organic medium comprising
i) at least one elastomer and
ii) an organic diluent
with an aqueous medium comprising at least one LCST compound having a cloud point of 0 to 100° C., preferably 5 to 100° C., more preferably 15 to 80° C. and even more preferably 20 to 70° C. and
removing at least partially the organic diluent to obtain the aqueous slurry comprising the elastomer particles, whereby the elastomers are ethylene propylene diene M-class rubbers (EPDM).

1. In a specific embodiment 2 according to specific embodiment 1 the organic medium comprising at least a ethylene propylene diene M-class rubbers (EPDM) rubber and an organic diluent is obtained from a polymerization reaction.

2. In a specific embodiment 3 according to specific embodiment 1 or 2 the organic medium is obtained from a polymerization reaction and further contains residual monomers of the polymerization reaction.

In a specific embodiment 4 according to one of specific embodiments 1 to 3 the aqueous medium contains of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of multivalent metal ions calculated on their metal content and with respect to the amount of ethylene propylene diene M-class rubbers (EPDM) present in the medium obtained according to step A)*.

In a specific embodiment 5 according to one of specific embodiments 1 to 4 the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of carboxylic acid salts of multivalent metal ions calculated on their metal content and with respect to the amount of ethylene propylene diene M-class rubbers (EPDM) present in the medium obtained according to step b).

In a specific embodiment 6 according to specific embodiments 4 or 5 the salts of multivalent metal ions are calcium stearate and/or zinc stearate and/or calcium palmitate and/or zinc palmitate.

In a specific embodiment 7 according to specific embodiment 6 the carboxylic acid salts of multivalent metal ions are calcium stearate and/or zinc stearate and/or calcium palmitate and/or zinc palmitate.

In a specific embodiment 8 according to one of specific embodiments 1 to 7 the organic medium comprising at least one elastomer and an organic diluent is obtained from a polymerization reaction comprising at least the steps of:
a) providing a reaction medium comprising an organic diluent, and at least two monomers whereby at least one monomer is an isoolefin and at least one monomer is a multiolefin;
b) polymerizing the monomers within the reaction medium in the presence of an initiator system to form an organic medium comprising the copolymer, the organic diluent and optionally residual monomers.

In a specific embodiment 9 according to one of specific embodiments 1 to 8 step A*) is carried out batchwise or continuously, preferably continuously.

In a specific embodiment 10 according to one of specific embodiments 1 to 9 the temperature in step A*) is from 10 to 100° C., preferably from 50 to 100° C., more preferably from 60 to 95° C. and even more preferably from 75 to 95° C.

In a specific embodiment 11 according to one of specific embodiments 1 to 10 the at least one LCST compound is selected from the group consisting of:
poly(N-isopropylacrylamide), poly(N-isopropylacrylamide-co-N,N-dimethylacrylamide, poly(N-isopropylacrylamide)-alt-2-hydroxyethylmethacrylate, poly(N-vinylcaprolactam), poly(N,N-diethylacrylamide), poly[2-(dimethylamino)ethyl methacrylate], poly(2-oxazoline) glyelastomers, Poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, preferably those with 2 to 6 ethylene glycol units and 2 to 6 polypropylene units, compounds of formula (I)

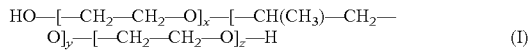

HO—[—CH$_2$—CH$_2$—O]$_x$—[—CH(CH$_3$)—CH$_2$—O]$_y$—[—CH$_2$—CH$_2$—O]$_z$—H    (I)

with y=3 to 10 and x and z=1 to 8, whereby y+x+z is from 5 to 18,
polyethyleneglycol-co-polypropylene glycol, preferably those with 2 to 8 ethylene glycol units and 2 to 8 polypropylene units, ethoxylated iso-C$_{13}$H$_{27}$-alcohols, preferably with an ethoxylation degree of 4 to 8, polyethylene glycol with 4 to 50, preferably 4 to 20 ethyleneglycol units, polypropylene glycol with 4 to 30, preferably 4 to 15 propyleneglycol units, polyethylene glycol monomethyl, dimethyl, monoethyl and diethyl ether with 4 to 50, preferably 4 to 20 ethyleneglycol units, polypropylene glycol monomethyl, dimethyl, monoethyl and diethyl ether with 4 to 50, preferably 4 to 20 propyleneglycol units, whereby in another embodiment the aforementioned LCST compounds additionally include hydroxyethylcellulose and whereby methyl cellulose, hydroxypropyl cellulose, hydroxyethyl methylcellulose and hydroxypropyl methylcellulose are preferred.

In a specific embodiment 12 according to one of specific embodiments 1 to 11the process comprises a further step wherein the elastomer particles contained in the aqueous slurry obtained according to step A*) are separated to obtain isolated elastomer particles.

In a specific embodiment 13 according to one of specific embodiments 1 to 11the process comprises a further step wherein the elastomer particles contained in the aqueous slurry obtained according to step A*) are separated to obtain isolated elastomer particles and further step wherein the (isolated) elastomer particles are dried, preferably to a residual content of volatiles of 7,000 or less, preferably 5,000 or less, even more preferably 4,000 or less and in onother embodiment 2,000 ppm or less, preferably 1,000 ppm or less.

In a specific embodiment 14 according to one of specific embodiments 1 to 12 the process comprises as a further step shaping of the elastomer particles to obtain reshaped elastomer particles such as pellets or shaped articles such as bales.

In a specific embodiment 15 the invention encompasses an aqueous slurry obtainable according to one of specific embodiments 1 to 14.

In a specific embodiment 16 the invention encompasses the use of LCST compounds having a cloud point of 0 to 100° C., preferably 5 to 100° C., more preferably 15 to 80° C. and even more preferably 20 to 70° C. as defined in specific embodiment 1 as anti-agglomerant, in particular for ethylene propylene diene M-class rubbers (EPDM).

In a specific embodiment 17 the invention encompasses a method to prevent or reduce or to slow-down agglomeration of slurries comprising ethylene propylene diene M-class rubber particles suspended in aqueous media by addition or use of LCST compounds having a cloud point of 0 to 100° C., preferably 5 to 100° C., more preferably 15 to 80° C. and even more preferably 20 to 70° C. as defined in specific embodiment 1.

In a specific embodiment 18 the invention encompasses halogenated butyl rubber particles having a ethylene propylene diene M-class rubber (EPDM) content of 98.5 wt.-% or more, preferably 98.8 wt.-% or more, more preferably 99.0 wt.-% or more even more preferably 99.2 wt.-% or more, yet even more preferably 99.4 wt.-% or more and in another embodiment 99.5 wt.-% or more.

In a specific embodiment 19 according to specific embodiment 18 the ethylene propylene diene M-class rubber (EPDM) has a weight average molecular weight in the range of from 10 to 2,000 kg/mol, preferably in the range of from 20 to 1,000 kg/mol, more preferably in the range of from 50 to 1,000 kg/mol, even more preferably in the range of from 200 to 800 kg/mol, yet more preferably in the range of from 375 to 550 kg/mol, and most preferably in the range of from 400 to 500 kg/mol.

In a specific embodiment 20 according to specific embodiments 18 or 19 the ethylene propylene diene M-class rubber (EPDM) has a Mooney viscosity of at least 10 (ML 1+8 at 125° C., ASTM D 1646), preferably of from 20 to 80 and even more preferably of from 25 to 60 (ML 1+8 at 125° C., ASTM D 1646).

In a specific embodiment 21 according to one of specific embodiments 18 to 20 the ethylene propylene diene M-class rubber (EPDM) particles further comprise 0 to 0.4 wt.-%, preferably 0 to 0.2 wt.-%, more preferably 0 to 0.1 wt.-% and more preferably 0 to 0.05 wt.-% of salts of multivalent metal ions, prefably stearates and palmitates of multivalent metal ions.

In a specific embodiment 22 according to one of specific embodiments 18 to 21 the ethylene propylene diene M-class rubber (EPDM) particles further comprise 1 ppm to 18,000 ppm, preferably 1 ppm to 5,000 ppm, more preferably from 1 ppm to 2,000 ppm and in a more preferred embodiment from 5 to 1,000 ppm or from 5 to 500 ppm of at least one LCST compound.

In a specific embodiment 23 the invention encompasses a shaped article, in particular a pellet or bale obtainable by shaping ethylene propylene diene M-class rubber (EPDM) particles according to specific embodiments 18 to 22.

In a specific embodiment 24 the invention encompasses blends or compounds obtainable by blending or compounding the ethylene propylene diene M-class rubber (EPDM) particles according to specific embodiments 18 to 22 or the shaped articles of specific embodiment 23.

In a specific embodiment 25 the invention encompasses the use of the ethylene propylene diene M-class rubber (EPDM) particles according to specific embodiments 18 to 22 or the shaped articles of specific embodiment 23 or the blends or compounds according to specific embodiment 24 for innerliners, bladders, tubes, air cushions, pneumatic springs, air bellows, accumulator bags, hoses, conveyor belts and pharmaceutical closures, automobile suspension bumpers, auto exhaust hangers, body mounts, shoe soles, tire sidewalls and tread compounds, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, a container closure or lid; a seal or sealant, such as a gasket or caulking; a material handling apparatus, such as an auger or conveyor belt; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing.

The invention also encompasses specific embodiments which are combinations of the 25 specific embodiments listed hereinabove with general embodiments, including any level of preferred embodiments, ranges parameters as disclosed above.

The invention is hereinafter further explained by the examples without being limited thereto.

EXPERIMENTAL SECTION

A rubber cement was prepared by dissolving of an ethylene/α-olefin-diene copolymer having a Mooney viscosity (ML (1+4) 125° C.) of 65, repeating units derived from ethylene in an amount of 48 wt.-%, repeating units derived from ENB as diene in an amount of 9 wt.-%, the remainder repeating units being derived from propylene in hexanes (~80% n-hexane, remainder being branched hexane isomers) and removal of insolubles by centrifugation. The total concentration of rubber in the cement was 5 wt %. This cement (171 g, in total 8.55 g based on the mass of rubber) was pumped using a peristaltic pump at a flow rate of 100 mL per minute into an agitated vessel containing Exp. 1): 2 l deionized water at a temperature of 65° C. at atmospheric pressure Exp. 2): 2 l deionized water comprising 0.01 g (or 0.12 wt % with respect to rubber) of methyl cellulose.

Low pressure steam (approximately 5-10 psi) was injected into the cement stream at the point of cement entry into the water vessel.

For Exp. 1 a coarse agglomerate is formed, in Exp. 2 fine rubber crumb is obtained The methyl cellulose employed was methyl cellulose type M 0512 purchased by Sigma Aldrich having a viscosity of 4000 cp at 2 wt.-% in water and 20° C. and a molecular weight of 88,000, a degree of substitution of from 1.5 to 1.9 and methoxy substitution of 27.5 to 31.5 wt.-%.

It exhibited a cloud point of 39.0° C. determined by method 5):

DIN EN 1890 of September 2006, method A wherein the amount of compound tested is reduced from 1 g per 100 ml of distilled water to 0.2 g per 100 ml of distilled water.

It exhibited a cloud point of 37.80 determined by method 4):

DIN EN 1890 of September 2006, method A wherein the amount of compound tested is reduced from 1 g per 100 ml of distilled water to 0.05 g per 100 ml of distilled water.

What is claimed is:

1. A process for the preparation of an aqueous slurry comprising a plurality of elastomer particles suspended therein, the process comprising:
   A) contacting an organic medium comprising
      i) at least one elastomeric ethylene/α-olefin copolymer, and
      ii) an organic diluent
      with an aqueous medium comprising at least one LOST compound having a cloud point of 0 to 100° C., and
   B) removing at least partially the organic diluent to obtain an aqueous slurry comprising the elastomeric ethylene/α-olefin copolymer particles.

2. The process according to claim 1, wherein the elastomeric ethylene/α-olefin copolymer is selected from the group consisting of ethylene-propylene diene M-class rubbers (EPDM) and ethylene propylene copolymers.

3. The process according to claim 1, wherein the aqueous medium contains 0 to 5,000 ppm of salts of multivalent metal ions, calculated on their metal content and with respect to the amount of copolymer present in the medium obtained according to step A).

4. The process according to claim 1, wherein step A) is carried out batchwise or continuously.

5. The process according to claim 1, wherein the temperature in step A) is 75° C. to 140° C.

6. The process according to claim 1, wherein the at least one LCST compound is selected from the group consisting of: poly(N-isopropylacrylamide), poly(N-isopropylacrylamide-co-N,N-dimethylacryl-amide), poly(N-isopropylacrylamide)-alt-2-hydroxyethylmethacrylate, poly(N-vinylcaprolactam), poly(N,N-diethylacrylamide), poly[2-(dimethylamino)ethyl methacrylate], poly(2-oxazoline) glyelasomers, poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, compounds of formula (I)

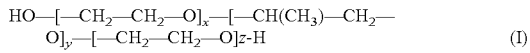

with y=3 to 10 and x and z=1 to 8, whereby y+x+z is from 5 to 18, ethoxylated iso-$C_{13}H_{27}$-alcohols, polyethylene glycol with 4 to 50 ethyleneglycol units, polypropylene glycol with 4 to 30 propyleneglycol units, polyethylene glycol monomethyl, dimethyl, monoethyl, and diethyl ether with 4 to 50 ethyleneglycol units, and polypropylene glycol monomethyl, dimethyl, monoethyl and diethyl ether with 4 to 50 propyleneglycol units.

7. The process according to claim 6, wherein when the at least one LCST compound is selected from the group consisting of:
polyethyleneglycol-co-polypropylene glycols having 2 to 8 ethylene glycol units and 2 to 8 polypropylene units;
ethoxylated iso-$C_{13}H_{27}$-alcohol having an ethoxylation degree of 4 to 8;
polyethylene glycol having 4 to 20 ethyleneglycol units;
polypropylene glycol having 4 to 15 propyleneglycol units;
polyethylene glycol monomethyl, dimethyl, monoethyl, and diethyl ether having 4 to 20 ethyleneglycol units; and
polypropylene glycol monomethyl, dimethyl, monoethyl and diethyl ether having 4 to 20 propyleneglycol units.

8. The process according to claim 6, wherein when the at least one LCST compound is selected from methyl cellulose, hydroxypropyl cellulose, hydroxyethyl methyl cellulose and hydroxypropyl methylcellulose.

9. The process according to claim 1, further comprising a step C) wherein the elastomeric ethylene/α-olefin copolymer particles contained in the aqueous slurry obtained according to step B) are separated from the slurry to obtain isolated elastomeric ethylene/α-olefin copolymer particles.

10. The process according to claim 1, further comprising:
step C) separating the elastomeric ethylene/α-olefin copolymer particles contained in the aqueous slurry obtained according to step B) from the slurry to obtain isolated elastomer particles, and
step D) drying the isolated elastomer particles, preferably to a residual content of volatiles of 7,000 ppm or less.

11. The process according to claim 1, further comprising:
separating the elastomeric ethylene/α-olefin copolymer from the aqueous slurry, and
shaping of the elastomeric ethylene/α-olefin copolymer particles to obtain at least one of reshaped elastomer particles that are pellets or shaped articles that are bales.

12. An aqueous slurry obtained by the process according to claim 1.

13. A method to prevent or reduce or to slow-down agglomeration of slurries comprising elastomeric ethylene/α-olefin copolymer particles suspended in aqueous media, the method comprising adding at least one LOST compound having a cloud point of 0 to 100° C. to a slurry comprising elastomeric ethylene/α-olefin copolymer particles suspended therein.

14. Elastomeric ethylene/α-olefin copolymer particles comprising: an elastomeric ethylene/α-olefin copolymer content of 98.5 wt. % or more; and
1 ppm to 18,000 ppm of at least one LCST compound.

15. Elastomeric ethylene/α-olefin copolymer particles comprising:
I) 100 parts by weight of an ethylene/α-olefin copolymer;
II) 0.0001 to 0.5 parts by weight of at least one LCST compound;
III) no or 0.0001 to 3.0 parts by weight of total of salts of mono- or multivalent metal 10 ns;
IV) no or 0.005 to 0.1 parts by weight of antioxidants; and
V) 0.005 to 0.5 parts by weight of volatiles having a boiling point at standard pressure of 200° C. or less.

* * * * *

UNITED STATES PATENT AND TRADEMARK OFFICE
CERTIFICATE OF CORRECTION

PATENT NO. : 10,647,842 B2  
APPLICATION NO. : 15/107529  
DATED : May 12, 2020  
INVENTOR(S) : David Thompson and Clinton Lund Page 1 of 1

It is certified that error appears in the above-identified patent and that said Letters Patent is hereby corrected as shown below:

In the Claims

Column 24, Lines 25 and 26, delete "at least one LOST compound" and insert --at least one LCST compound--

Column 26, Line 14, "at least one LOST compound" and insert --at least one LCST compound--

Signed and Sealed this  
Twenty-first Day of July, 2020

Andrei Iancu  
*Director of the United States Patent and Trademark Office*